(12) United States Patent
Kim et al.

(10) Patent No.: US 12,246,582 B2
(45) Date of Patent: Mar. 11, 2025

(54) APPARATUS FOR CONTROLLING FAN MOTOR OF VEHICLE COOLING FAN AND METHOD THEREOF

(71) Applicants: Hyundai Motor Company, Seoul (KR); Kia Corporation, Seoul (KR)

(72) Inventors: Taewan Kim, Yongin-si (KR); Kiran Kumar M., Telangana (IN); S. S. Harish, Chennai (IN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 104 days.

(21) Appl. No.: 18/356,821

(22) Filed: Jul. 21, 2023

(65) Prior Publication Data

US 2024/0317025 A1    Sep. 26, 2024

(30) Foreign Application Priority Data

Mar. 20, 2023  (IN) .............................. 202311018852

(51) Int. Cl.
*B60H 1/32*    (2006.01)

(52) U.S. Cl.
CPC ......... *B60H 1/3225* (2013.01); *B60H 1/3227* (2013.01); *B60H 2001/3251* (2013.01); *B60H 2001/3266* (2013.01); *B60H 2001/3277* (2013.01)

(58) Field of Classification Search
CPC ................ B60H 1/3225; B60H 1/3227; B60H 2001/3252; B60H 2001/3266; B60H 2001/3277

See application file for complete search history.

(56) References Cited

U.S. PATENT DOCUMENTS

2012/0199661 A1* 8/2012 Hara .................. B60H 1/00528
                                                          236/92 B
2018/0111444 A1* 4/2018 Kim ...................... B60H 1/3216

* cited by examiner

*Primary Examiner* — Marc E Norman
(74) *Attorney, Agent, or Firm* — Slater Matsil, LLP

(57) ABSTRACT

An apparatus including an air conditioner device including a condenser, an expansion valve, an evaporator, and a compressor, a cooling fan configured to cool the condenser, wherein the cooling fan includes a fan motor and a blade, a sensing unit, and a controller configured to determine whether an operating condition of the cooling fan and a flooding condition of a vehicle are satisfied based on driving information of the vehicle detected by the sensing unit and to control an operation of the fan motor of the cooling fan according to whether the vehicle is flooded.

20 Claims, 4 Drawing Sheets

APPARATUS FOR CONTROLLING FAN MOTOR OF VEHICLE COOLING FAN AND METHOD THEREOF

CROSS-REFERENCE TO RELATED APPLICATIONS

This application claims the benefit of Indian patent application Ser. No. 202311018852, filed in the Indian Patent Office on Mar. 20, 2023, which application is hereby incorporated herein by reference.

TECHNICAL FIELD

The present invention relates to an apparatus for controlling a fan motor of a vehicle cooling fan and a method thereof.

BACKGROUND

In general, an air conditioner applied to a vehicle includes an air conditioner device which is an air conditioner for heating and cooling the interior of the vehicle.

This air conditioner system maintains a comfortable indoor environment by maintaining the interior temperature of the vehicle at an appropriate temperature regardless of external temperature changes, and is configured to heat or cool the interior of the vehicle by heat exchange by an evaporator in a process in which a refrigerant discharged by the operation of a compressor circulates back to the compressor through a condenser, an expansion valve, and the evaporator.

That is, the air conditioner system lowers the indoor temperature and humidity through evaporation in the evaporator through the expansion valve after a high-temperature and high-pressure gaseous refrigerant compressed from the compressor is condensed through the condenser in a summer cooling mode.

Here, when an air-cooled condenser is applied to the air conditioner device for condensing the refrigerant, the refrigerant in the condenser is condensed by heat exchange between air and the refrigerant by an operation of a cooling fan. In general, the cooling fan includes a fan motor and a blade.

However, when the vehicle is driving on a flooded road and the driver accelerates to escape from the flooded road, the fan motor of the cooling fan operates in a flooded state, and as a result, there is a problem in that the fan motor of the cooling fan is damaged due to overload (or overcurrent).

In particular, when the vehicle drives in a monsoon climate region, this problem frequently occurs.

The above information disclosed in this background section is only for enhancement of understanding of the background of embodiments of the invention, and therefore it may contain information that does not form the prior art that is already known to a person of ordinary skill in the art.

SUMMARY

The present invention relates to an apparatus for controlling a fan motor of a vehicle cooling fan and a method thereof. Particular embodiments relate to an apparatus for controlling a fan motor of a vehicle cooling fan and a method thereof capable of preventing a fan motor of a cooling fan from being damaged when a vehicle is flooded.

Embodiments of the present invention provide an apparatus for controlling a fan motor of a vehicle cooling fan and a method thereof having advantages of preventing a fan motor of a cooling fan from being damaged when a vehicle is driving on a flooded road.

An exemplary embodiment of the present invention provides an apparatus for controlling a fan motor of a vehicle cooling fan that includes an air conditioner device including a condenser, an expansion valve, an evaporator, and a compressor, a cooling fan cooling the condenser and including a fan motor and a blade, a sensing unit configured to detect driving information of a vehicle, and a controller configured to determine whether an operating condition of the cooling fan and a flooding condition of the vehicle are satisfied based on the driving information detected by the sensing unit, and control an operation of the fan motor of the cooling fan according to whether the vehicle is flooded.

The sensing unit may include an air conditioner operation sensor configured to receive an input of whether the air conditioner device is operated, a pressure sensor configured to detect a refrigerant pressure inside the condenser, a relay sensor configured to detect whether a relay for starting the compressor is operated. a temperature sensor configured to detect a temperature of a coolant of the vehicle, and a speed sensor configured to detect a speed of the vehicle.

When the air conditioner operation sensor is turned on, the refrigerant pressure detected by the pressure sensor is equal to or greater than a reference pressure, the relay sensor is turned on, the coolant temperature detected by the temperature sensor is equal to or greater than a reference temperature, and the speed of the vehicle detected by the speed sensor is equal to or greater than a reference speed, the controller may determine that the operating condition of the cooling fan is satisfied.

The controller may determine whether the vehicle is flooded based on a refrigerant pressure change rate inside the condenser detected by the pressure sensor.

The controller may determine that the vehicle is flooded when the refrigerant pressure change rate is less than a first reference change rate, and determine that the vehicle is not flooded when the refrigerant pressure change rate exceeds a second reference change rate.

When the cooling fan is operated and it is determined that the vehicle is flooded, the controller may stop the operation of the fan motor.

When the cooling fan is operated and it is determined that the vehicle is not flooded, the controller may maintain the operation of the fan motor.

Another embodiment of the present invention provides a method of controlling a fan motor of a vehicle cooling fan that includes detecting, by a sensing unit, driving information of a vehicle, determining, by a controller, whether an operating condition of a cooling fan for cooling a condenser of an air conditioner device is satisfied based on the driving information, determining, by the controller, whether a flooding condition of the vehicle is satisfied based on the driving information, and controlling, by the controller, an operation of a fan motor of the cooling fan based on whether the cooling fan operates and whether the vehicle is flooded.

In the determining of whether the cooling fan is operated, when an operation sensor of the air conditioner device is turned on, a refrigerant pressure inside the condenser is equal to or greater than a reference pressure, a relay for activating a compressor of the air conditioner device is turned on, a coolant temperature of the vehicle is equal to or greater than a reference temperature, and a speed of the vehicle is equal to or greater than a reference speed, it may be determined that the cooling fan is operated.

In the determining of whether the vehicle is flooded, whether the vehicle is flooded may be determined based on a refrigerant pressure change rate inside the condenser.

It may be determined that the vehicle is flooded when the refrigerant pressure change rate exceeds a first reference change rate, and it may be determined that the vehicle is not flooded when the refrigerant pressure change rate is less than a second reference change rate.

When the cooling fan is operated and it is determined that the vehicle is flooded, the operation of the fan motor may be stopped by the controller.

When the cooling fan is operated and it is determined that the vehicle is not flooded, the operation of the fan motor may be maintained by the controller.

According to an embodiment of the present invention, by controlling the operation of the fan motor of the cooling fan according to whether the vehicle is flooded, it is possible to prevent the fan motor from being damaged and to improve durability of the fan motor.

BRIEF DESCRIPTION OF THE DRAWINGS

Since these drawings are for reference in describing exemplary embodiments of the present invention, the technical spirit of the present invention should not be construed as being limited to the accompanying drawings.

Figure 1:
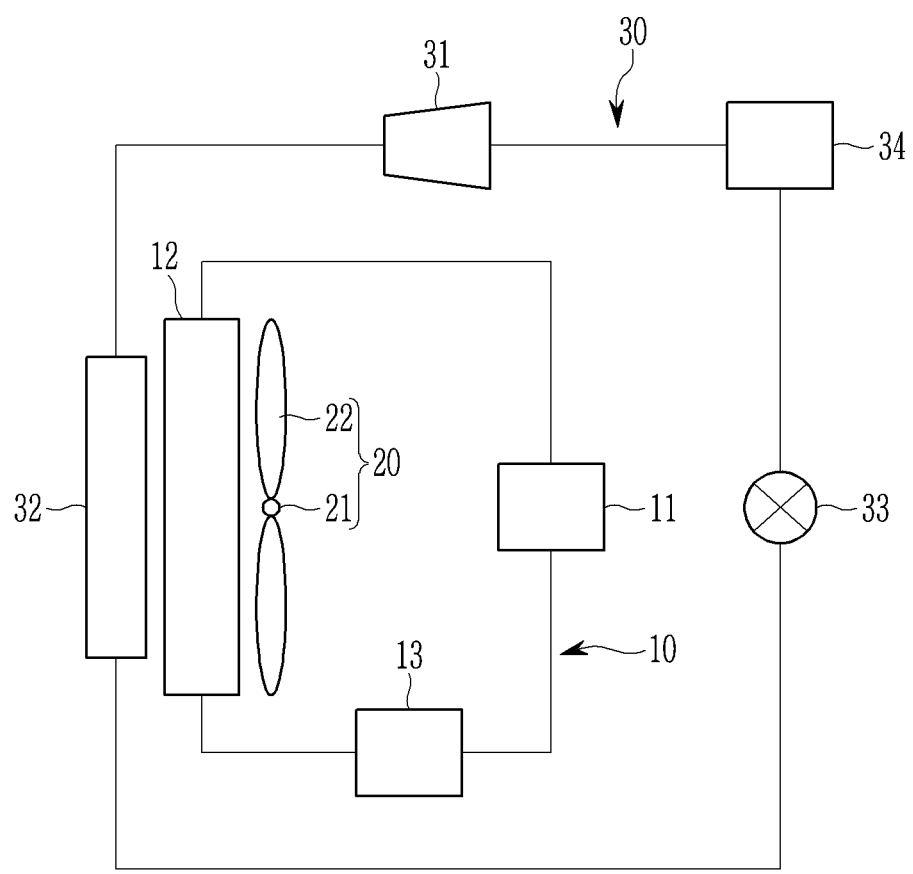
FIG. 1 is a conceptual diagram illustrating a configuration of an apparatus for controlling a fan motor of a vehicle cooling fan according to an embodiment of the present invention.

The following reference identifiers may be used in connection with the accompanying drawings to describe exemplary embodiments of the present disclosure.

| | |
|---|---|
| 10: Cooling system | 11: Engine |
| 12: Radiator | 13: Water pump |
| 20: Cooling fan | 21: Fan motor |
| 22: Blade | 30: Air conditioner device |
| 31: Compressor | 32: Condenser |
| 33: Expansion valve | 34: Evaporator |
| 40: Sensing unit | 41: Air conditioner operating sensor |
| 42: Pressure sensor | 43: Relay sensor |
| 44: Temperature sensor | 45: Speed sensor |
| 50: Controller | |

DETAILED DESCRIPTION OF ILLUSTRATIVE EMBODIMENTS

With reference to the accompanying drawings, embodiments of the present invention will be described in detail so that those of ordinary skill in the art to which the present invention pertains can easily implement them. However, the present invention may be embodied in various different forms and is not limited to the embodiments described herein.

In order to clearly describe embodiments of the present invention, parts irrelevant to the description are omitted, and the same reference numerals are assigned to the same or similar elements throughout the specification.

In addition, since the size and thickness of each component illustrated in the drawings are arbitrarily indicated for convenience of description, embodiments of the present invention are not necessarily limited to that illustrated in the drawings, and the thickness is enlarged in order to clearly express various parts and regions.

The suffixes "module" and/or "unit" for components used in the following description are given or interchanged in consideration of only the ease of writing the specification, and do not have distinct meanings or roles by themselves.

In addition, in describing the embodiments disclosed in the present specification, when it is determined that detailed descriptions of related known technologies may obscure the gist of the embodiments disclosed in the present specification, a detailed description thereof will be omitted.

Moreover, the accompanying drawings are only for easy understanding of the embodiments disclosed in the present specification, the technical spirit disclosed herein is not limited by the accompanying drawings, and it should be understood to include all modifications, equivalents and substitutes included in the spirit and scope of the present invention.

In describing embodiments in the present application, terms such as "include" or "have" are intended to designate that a feature, number, step, operation, component, part, or combination thereof described in the specification exists, but it should be understood that it does not preclude the possibility of addition or existence of one or more other features or numbers, steps, operations, components, parts, or combinations thereof.

In the flowchart described with reference to the drawings, the order of operations may be changed, several operations may be merged, some operations may be divided, and specific operations may not be performed.

A component, "unit", "group", "block", or "module" used in the embodiments of the present invention may be implemented by software such as a task, class, subroutine, process, object, thread of execution, and program performed in a predetermined area in memory, hardware such as a field-programmable gate array (FPGA) or an application-specific integrated circuit (ASIC), or a combination of the software and hardware. The "component", "unit", or the like may be included in a computer-readable storage medium, or a part thereof may be distributed in a plurality of computers.

Hereinafter, an apparatus for controlling a fan motor of a vehicle cooling fan according to embodiments of the present invention will be described in detail with reference to the accompanying drawings.

FIG. 1 is a conceptual diagram illustrating a configuration of an apparatus for controlling a fan motor of a vehicle cooling fan according to an embodiment of the present invention. Moreover, FIG. 2 is a block diagram illustrating the configuration of the apparatus for controlling the fan motor of the vehicle cooling fan according to an embodiment of the present invention.

Figure 2:
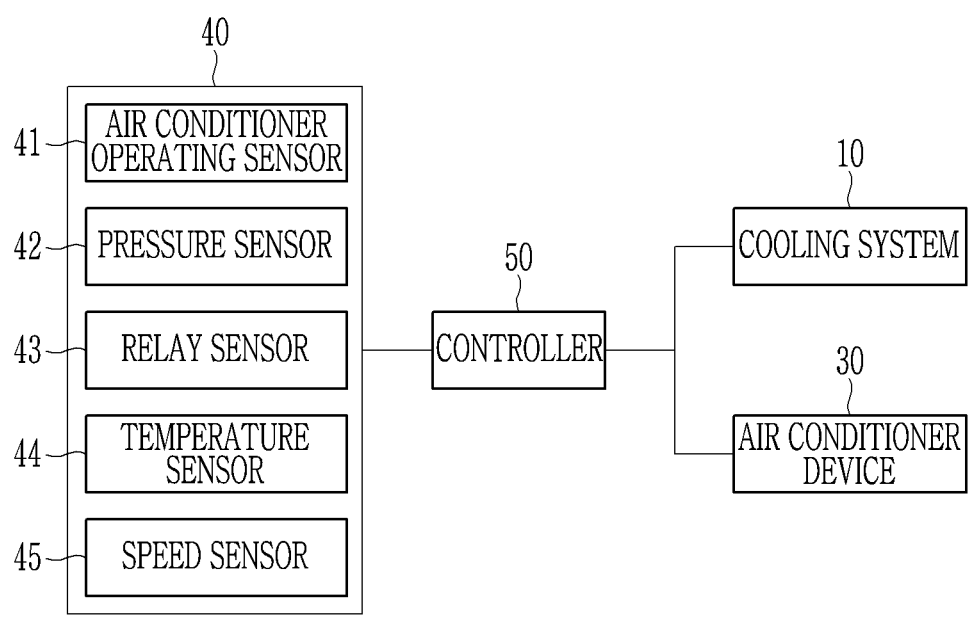
FIG. 2 is a block diagram illustrating the configuration of the apparatus for controlling the fan motor of the vehicle cooling fan according to an embodiment of the present invention.

As illustrated in FIGS. 1 and 2, the apparatus for controlling the fan motor of the vehicle cooling fan according to an embodiment of the present invention is applied to an air conditioner device 30 integrated in a vehicle cooling system 10.

First, the cooling system 10 may include an engine 11, a radiator 12, and a water pump 13. Here, the engine 11, the radiator 12, and the water pump 13 are arranged on a cooling line through which a coolant circulates.

The engine 11 includes a plurality of combustion chambers for generating power necessary for driving the vehicle by combustion of a fuel. The radiator 12 cools the coolant through heat exchange with outside air, and a cooling fan 20 for cooling the radiator 12 is disposed in front of the radiator 12. The water pump 13 circulates the coolant cooled by the radiator 12. The water pump 13 may be an electric water pump 13 operated by an electric motor.

The air conditioner device 30 includes a condenser 32 disposed in front (or rearward) of the radiator 12 and condensing the refrigerant by heat exchange with the outside air. That is, the condenser 32 may be an air-cooled condenser 32. In the condenser 32, the refrigerant flowing into a condensing port is condensed by the operation of the cooling fan 20.

The cooling fan 20 cools the coolant flowing into the radiator 12 through heat exchange with the outside air and condenses the coolant flowing into the condenser 32. To this end, the cooling fan 20 may include a fan motor 21 and a blade 22 rotated by the fan motor 21. The cooling fan 20 may be configured as an axial-flow fan that forcibly blows air. A heat dissipation effect (or heat dissipation efficiency) of the radiator 12 may be increased and a condensation effect (or condensation efficiency) of the condenser 32 may be increased by the cooling fan 20.

In addition, the air conditioner device 30 further includes an expansion valve 33 that expands the refrigerant discharged from the condenser 32, an evaporator 34 that evaporates the expanded refrigerant supplied from the expansion valve 33, and a compressor 31 that receives the refrigerant discharged from the evaporator 34 and compresses the refrigerant.

In the air conditioner device 30, the condenser 32, the expansion valve 33, the evaporator 34, and the compressor 31 are disposed on a refrigerant line through which the refrigerant flows.

Meanwhile, the apparatus for controlling the fan motor of the vehicle cooling fan according to an embodiment of the present invention includes a sensing unit 40 that detects driving information of the vehicle and a controller 50 that determines whether an operation condition of the cooling fan 20 is satisfied based on the driving information detected by the sensing unit 40, determines whether a flooding condition of the condition is satisfied, and controls the fan motor 21 of the cooling fan 20 according to whether the vehicle is flooded.

The controller 50 may control the overall operation of the vehicle as an electronic control unit (ECU). The controller 50 may be, for example, one or more microprocessors operated by a program (control logic) or hardware (for example, a microcomputer) including the microprocessor, and the program may include a series of instructions for executing the method of controlling the fan motor 21 of the vehicle cooling fan 20 according to an embodiment of the present invention. The command may be stored in the memory of the controller 50. The instructions may be stored in a memory of the controller 50.

The driving information may include an air conditioner operation signal, a refrigerant pressure inside the condenser 32, an activation signal of a relay that selectively cuts off power to activate the compressor 31 from a battery, a coolant temperature, and a vehicle speed.

To this end, the sensing unit 40 may include an air conditioner operating sensor 41 that receives an input of whether the air conditioner device 30 is operated from a driver (or an occupant of a vehicle), a pressure sensor 42 that detects the refrigerant pressure inside the condenser 32, a relay sensor 43 that detects whether the relay for activating the compressor 31 is operated, a temperature sensor 44 that detects the coolant temperature of the vehicle, and a speed sensor 45 that detects the speed of the vehicle. The driving information of the vehicle detected by the sensing unit 40 is transmitted to the controller 50.

Hereinafter, a method of controlling of the fan motor of the vehicle cooling fan according to an embodiment of the present invention as described above will be described in detail with reference to the accompanying drawings.

Figure 3:
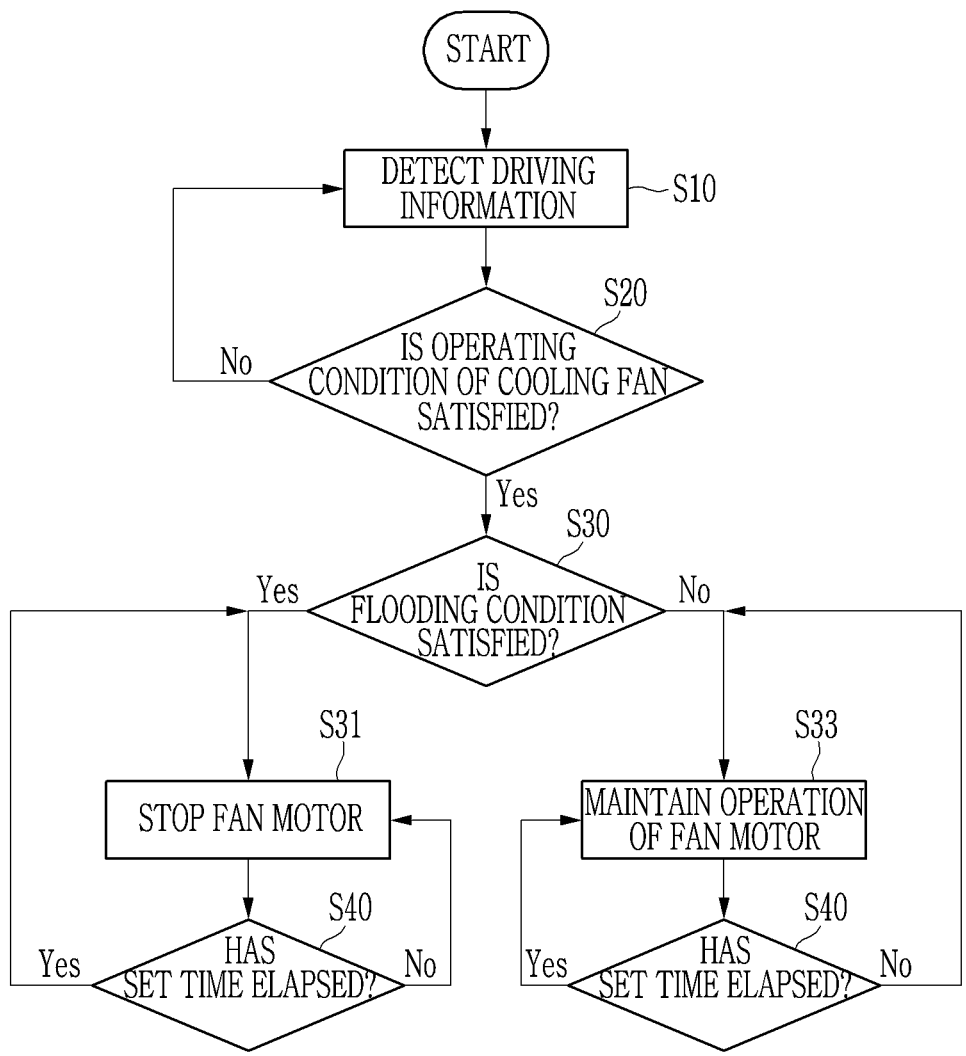
FIG. 3 is a flowchart illustrating a method of controlling a fan motor of a vehicle cooling fan according to an embodiment of the present invention.
Figure 4:
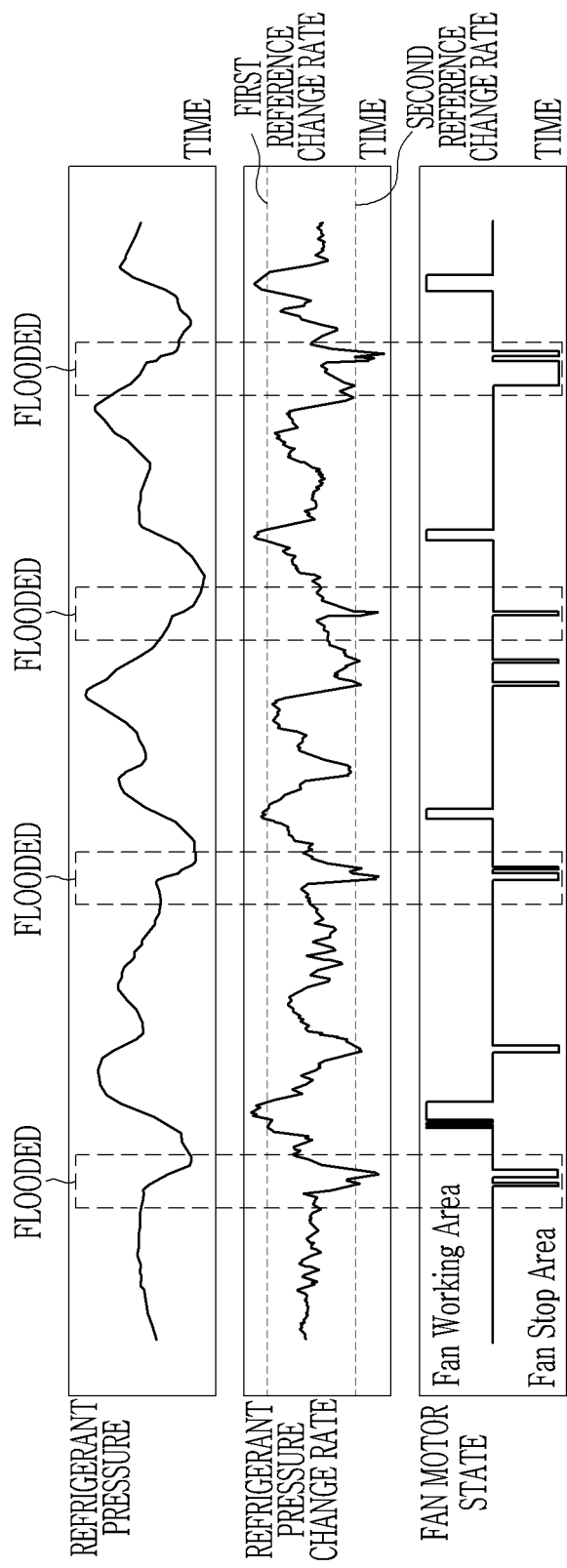
FIG. 4 is a graph for explaining an operation of the apparatus for controlling the fan motor of the vehicle cooling fan according to an embodiment of the present invention.

FIG. 3 is a flowchart illustrating the method of controlling the fan motor of the vehicle cooling fan according to an embodiment of the present invention. Moreover, FIG. 4 is a graph for explaining an operation of the apparatus for controlling the fan motor of the vehicle cooling fan according to an embodiment of the present invention.

Referring to FIG. 3, the sensing unit 40 detects driving information of the vehicle, and the detected driving information is transmitted to the controller 50 (S10).

The controller 50 determines whether the operating condition of the cooling fan 20 is satisfied based on the driving information detected by the sensing unit 40 (S20).

In this case, when the air conditioner operating sensor 41 is turned on by the driver (or the occupant of the vehicle), the refrigerant pressure detected by the pressure sensor 42 is equal to or greater than a reference pressure, the relay sensor is turned on, the coolant temperature detected by the temperature sensor 44 is equal to or greater than a reference temperature, and the vehicle speed detected by the speed sensor 45 is equal to or greater than a reference speed, the controller 50 may determine that the cooling fan 20 is operated (may determine that the operating condition of the cooling fan is satisfied).

When the operating condition of the cooling fan 20 is satisfied, the controller 50 determines whether the flooding condition of the vehicle is satisfied based on the driving information detected by the sensing unit 40 (S30).

In this case, the controller 50 may determine whether the flooding condition of the vehicle is satisfied based on a refrigerant pressure change rate inside the condenser 32 detected by the pressure sensor 42. The refrigerant pressure change rate may be calculated from a change in refrigerant pressure per unit time (for example, one second).

Specifically, when the refrigerant pressure change rate inside the condenser 32 exceeds a first reference change rate, the controller 50 may determine that the vehicle is flooded (refer to boxes indicated by dashed lines in FIG. 4). Moreover, when the refrigerant pressure change rate inside the condenser 32 is less than a second reference change rate, the controller 50 may determine that the vehicle is not flooded (in other words, the vehicle is out of the flooded state).

When the vehicle is flooded and the condenser 32 is flooded in water, heat exchange efficiency of the condenser 32 increases due to heat exchange between the water and the outside of the condenser 32, and the refrigerant pressure inside the condenser 32 drops sharply from high pressure to low pressure. That is, in a state where the vehicle is flooded (that is, the condenser 32 is flooded), when the refrigerant pressure inside the condenser 32 decreases to a specific rate (that is, the refrigerant pressure change rate is less than the first reference change rate), it may be determined that the vehicle is flooded.

Conversely, when the refrigerant pressure inside the condenser 32 increases to a specific rate (that is, when the refrigerant pressure change rate exceeds the second reference refrigerant change rate), it may be determined that the vehicle is not flooded (that is, the vehicle is out of the flooded state).

When the flooding condition of the vehicle is satisfied (that is, when it is determined that the vehicle is flooded), the controller 50 stops the operation of the fan motor 21 of the cooling fan 20 (S31) (refer to boxes indicated by dotted lines in FIG. 4). As such, when it is determined that the vehicle is flooded, the operation of the fan motor 21 of the cooling fan 20 is stopped, and thus, it is possible to prevent the fan motor 21 from operating in water and being damaged due to overload (or overcurrent) and improve durability of the fan motor 21.

When the vehicle does not satisfy the flooding condition (that is, when the flooding condition is released), the controller 50 maintains the operation of the fan motor 21 of the cooling fan 20 in the previous state (S33).

The controller 50 determines whether a set time (for example, 60 seconds) has elapsed (S40). When the set time elapses, it returns to Step S30.

That is, in case the state of the cooling fan 20 does not change due to an abnormal or unknown reason, it prevents an error from occurring in the logic stored in the controller 50 by checking whether the flooding condition is satisfied every set time (for example, 60 seconds).

According to the apparatus for controlling the fan motor of the vehicle cooling fan and the method thereof according to the embodiments of the present invention as described above, whether the vehicle is flooded is determined based on the refrigerant pressure change rate inside the condenser 32, and when the flooding condition is satisfied (that is, when the vehicle is flooded), by stopping the operation of the fan motor 21 of the cooling fan 20, it is possible to prevent damage to the fan motor 21 due to overcurrent and improve the durability of the cooling fan 20.

Although preferred embodiments of the present invention have been described above, the present invention is not limited thereto, various modifications can be made within the scope of the claims and the detailed description of the invention and the accompanying drawings, and it is natural that these also fall within the scope of the present invention.

What is claimed is:

1. An apparatus comprising:
    an air conditioner device comprising a condenser, an expansion valve, an evaporator, and a compressor;
    a cooling fan configured to cool the condenser, wherein the cooling fan comprises a fan motor and a blade;
    a sensing unit; and
    a controller configured to determine whether an operating condition of the cooling fan and a flooding condition of a vehicle are satisfied based on driving information of the vehicle detected by the sensing unit and to control an operation of the fan motor of the cooling fan according to whether the vehicle is flooded.

2. The apparatus of claim 1, wherein the sensing unit comprises:
    an air conditioner operation sensor configured to receive an input of whether the air conditioner device is operated;
    a pressure sensor configured to detect a refrigerant pressure inside the condenser;
    a relay sensor configured to detect whether a relay for starting the compressor is operated;
    a temperature sensor configured to detect a temperature of a coolant of the vehicle; and
    a speed sensor configured to detect a speed of the vehicle.

3. The apparatus of claim 2, wherein, in response to the air conditioner operation sensor being turned on, the refrigerant pressure detected by the pressure sensor being equal to or greater than a reference pressure, the relay sensor being turned on, the temperature of the coolant detected by the temperature sensor being equal to or greater than a reference temperature, and the speed of the vehicle detected by the speed sensor being equal to or greater than a reference speed, the controller is configured to determine that the operating condition of the cooling fan is satisfied.

4. The apparatus of claim 3, wherein the controller is configured to determine whether the vehicle is flooded based on a refrigerant pressure change rate inside the condenser detected by the pressure sensor.

5. The apparatus of claim 4, wherein the controller is configured to:
    determine that the vehicle is flooded when the refrigerant pressure change rate is less than a first reference change rate; and
    determine that the vehicle is not flooded when the refrigerant pressure change rate exceeds a second reference change rate.

6. The apparatus of claim 5, wherein, in response to the cooling fan being operated and a determination that the vehicle is flooded, the controller is configured to stop the operation of the fan motor.

7. The apparatus of claim 5, wherein, in response to the cooling fan being operated and a determination that the vehicle is not flooded, the controller is configured to maintain the operation of the fan motor.

8. A method of controlling a fan motor of a vehicle cooling fan, the method comprising:
    determining whether an operating condition of a cooling fan for cooling a condenser of an air conditioner device is satisfied based on driving information of a vehicle detected by a sensing unit;
    determining whether a flooding condition of the vehicle is satisfied based on the driving information; and
    controlling an operation of a fan motor of the cooling fan based on whether the cooling fan operates and whether the vehicle is flooded.

9. The method of claim 8, further comprising determining that the cooling fan is operated based on an operation sensor of the air conditioner device being turned on, a refrigerant pressure inside the condenser being equal to or greater than a reference pressure, a relay for activating a compressor of the air conditioner device being turned on, a coolant temperature of the vehicle being equal to or greater than a reference temperature, and a speed of the vehicle being equal to or greater than a reference speed.

10. The method of claim 9, further comprising determining whether the vehicle is flooded based on a refrigerant pressure change rate inside the condenser.

11. The method of claim 10, further comprising:
    determining that the vehicle is flooded based on the refrigerant pressure change rate exceeding a first reference change rate; and
    determining that the vehicle is not flooded based on the refrigerant pressure change rate being less than a second reference change rate.

12. The method of claim 11, further comprising, when the cooling fan is operated and it is determined that the vehicle is flooded, stopping the operation of the fan motor.

13. The method of claim 11, further comprising, when the cooling fan is operated and it is determined that the vehicle is not flooded, maintaining the operation of the fan motor.

14. A vehicle comprising:
a cooling system comprising an engine, a radiator, a water pump, and a cooling fan, wherein the engine, the radiator, and the water pump are disposed on a cooling line;
an air conditioner device integrated in the cooling system, wherein the air conditioner device comprises a compressor, a condenser, an expansion valve, and an evaporator disposed on a refrigerant line;
a sensing unit; and
a controller configured to determine whether an operating condition of the cooling fan and a flooding condition of the vehicle are satisfied based on driving information of the vehicle detected by the sensing unit and to control an operation of a fan motor of the cooling fan based on whether the vehicle is flooded.

15. The vehicle of claim 14, wherein the sensing unit comprises:
an air conditioner operation sensor configured to receive an input of whether the air conditioner device is operated;
a pressure sensor configured to detect a refrigerant pressure inside the condenser;
a relay sensor configured to detect whether a relay for starting the compressor is operated;
a temperature sensor configured to detect a temperature of a coolant of the vehicle; and
a speed sensor configured to detect a speed of the vehicle.

16. The vehicle of claim 15, wherein, in response to the air conditioner operation sensor being turned on, the refrigerant pressure detected by the pressure sensor being equal to or greater than a reference pressure, the relay sensor being turned on, the temperature of the coolant detected by the temperature sensor being equal to or greater than a reference temperature, and the speed of the vehicle detected by the speed sensor being equal to or greater than a reference speed, the controller is configured to determine that the operating condition of the cooling fan is satisfied.

17. The vehicle of claim 16, wherein the controller is configured to determine whether the vehicle is flooded based on a refrigerant pressure change rate inside the condenser detected by the pressure sensor.

18. The vehicle of claim 17, wherein the controller is configured to:
determine that the vehicle is flooded when the refrigerant pressure change rate is less than a first reference change rate; and
determine that the vehicle is not flooded when the refrigerant pressure change rate exceeds a second reference change rate.

19. The vehicle of claim 18, wherein, in response to the cooling fan being operated and a determination that the vehicle is flooded, the controller is configured to stop the operation of the fan motor.

20. The vehicle of claim 18, wherein, in response to the cooling fan being operated and a determination that the vehicle is not flooded, the controller is configured to maintain the operation of the fan motor.

* * * * *